(12) United States Patent
Xiao

(10) Patent No.: US 8,344,278 B2
(45) Date of Patent: Jan. 1, 2013

(54) CONTROL KEY ASSEMBLY FOR ELECTRONIC DEVICE

(75) Inventor: Zhi-Qiang Xiao, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 322 days.

(21) Appl. No.: 12/843,129

(22) Filed: Jul. 26, 2010

(65) Prior Publication Data

US 2011/0192709 A1   Aug. 11, 2011

(30) Foreign Application Priority Data

Feb. 8, 2010   (CN) .......................... 2010 1 0301388

(51) Int. Cl.
*H01H 23/00* (2006.01)

(52) U.S. Cl. ....................................... 200/339; 200/553

(58) Field of Classification Search .................. 200/341, 200/329, 339, 517, 553, 557, 558, 5 R, 6 R, 200/17 R, 18; 345/156, 168, 169, 184
See application file for complete search history.

(56) References Cited

U.S. PATENT DOCUMENTS

| 7,034,238 | B2 * | 4/2006 | Uleski et al. .................. 200/500 |
| 7,554,050 | B1 * | 6/2009 | Lv ................................. 200/339 |
| 7,790,995 | B2 * | 9/2010 | Burkett ....................... 200/61.41 |
| 7,812,271 | B2 * | 10/2010 | Lee et al. ...................... 200/5 R |

* cited by examiner

*Primary Examiner* — Amy Cohen Johnson
*Assistant Examiner* — Marina Fishman
(74) *Attorney, Agent, or Firm* — Altis Law Group, Inc.

(57) ABSTRACT

An exemplary control key assembly for an electronic device includes a housing and a control key. The housing forms a receiving portion. The receiving portion includes a resisting portion and a hole. The control key is positioned in the receiving portion. The control key includes an operating element and an elastic element. The operating element is received in the hole, and the elastic element includes a bent arm engaging with the resisting portion to limit the movement of the control key.

16 Claims, 7 Drawing Sheets

CONTROL KEY ASSEMBLY FOR ELECTRONIC DEVICE

BACKGROUND

1. Technical Field

The present disclosure relates to control key assemblies, particularly to a control key assembly used in a portable electronic device.

2. Description of Related Art

Many portable electronic devices, such as mobile phones, have a housing defining an interior compartment for receiving a printed circuit board (PCB). The devices often include a control key assembly on one side of the housing, allowing one-handed operation of the device.

Typically, the control key assembly is loosely located in a space defined in an outer shell of the portable electronic device, with a slight gap defined between the control key assembly and the outer shell. Each control key moves easily in a corresponding opening of the outer shell. However, if excessive force is applied, the control key may physically separate from the rest of the control key assembly.

Therefore, there is room for improvement within the art.

BRIEF DESCRIPTION OF THE DRAWINGS

Many aspects of the disclosed control key assembly can be better understood with reference to the following drawings. The components in the drawings are not necessarily drawn to scale, the emphasis instead being placed upon clearly illustrating the principles of the present control key assembly.

DETAILED DESCRIPTION

The disclosed control key assembly in accordance with various exemplary embodiments herein may be applied in portable electronic devices such as mobile phones, personal digital assistants (PDAs), and so on. In the exemplary embodiment, the control key assembly as used in a mobile phone is illustrated. However, the disclosure is not limited to use in a mobile phone.

Figure 1:
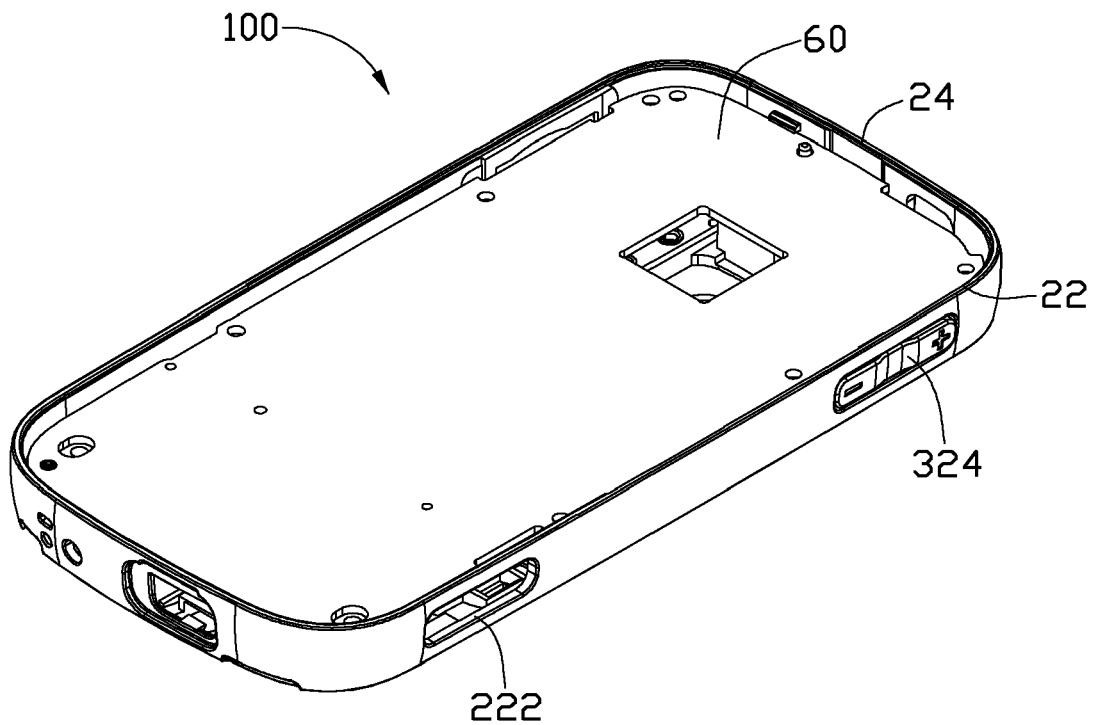
FIG. 1 is an assembled, isometric view of a portable electronic device, the portable electronic device including a housing, a PCB, and a control key assembly in accordance with an exemplary embodiment.
Figure 2:
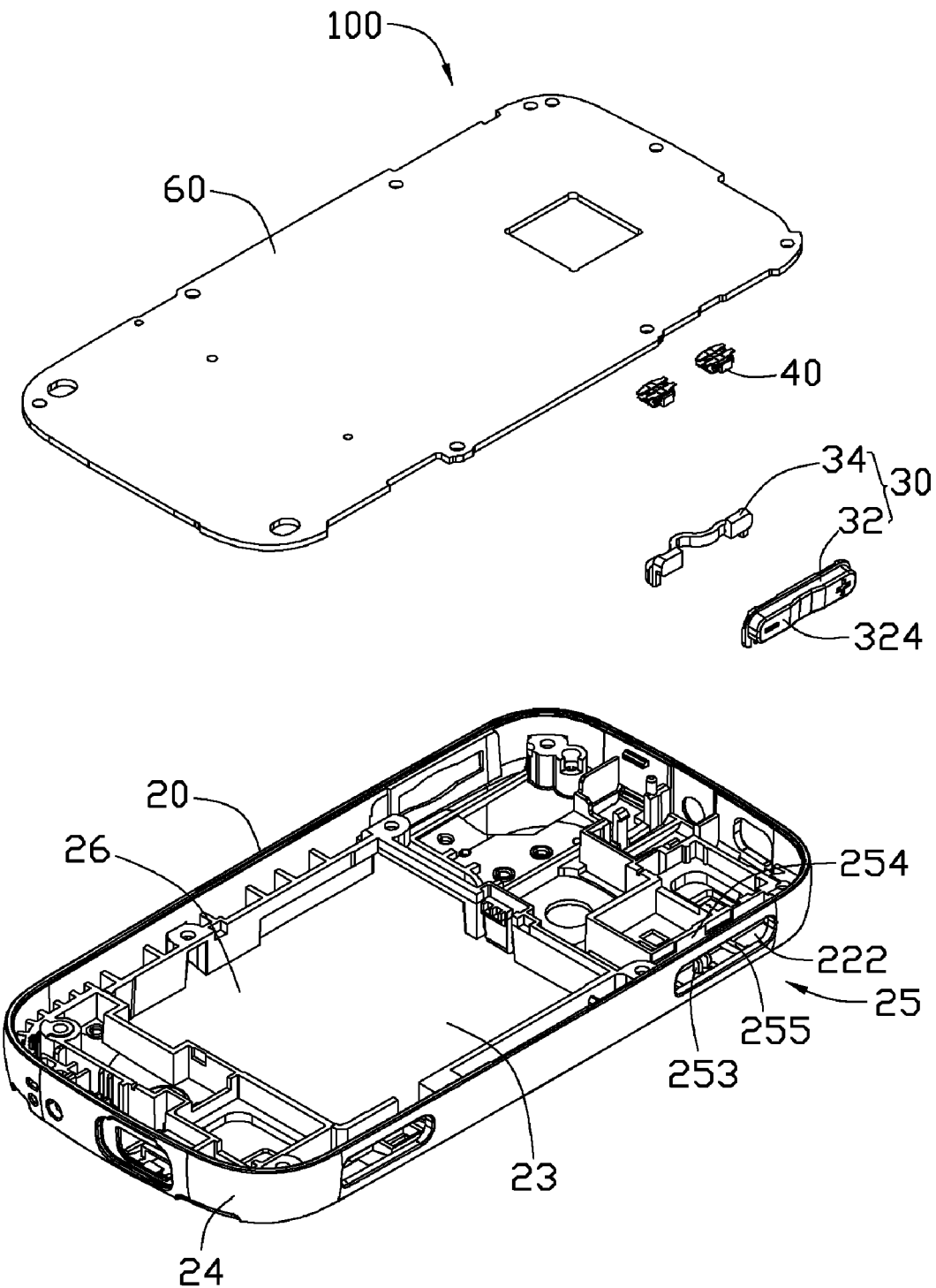
FIG. 2 is an exploded view of FIG. 1.
Figure 3:
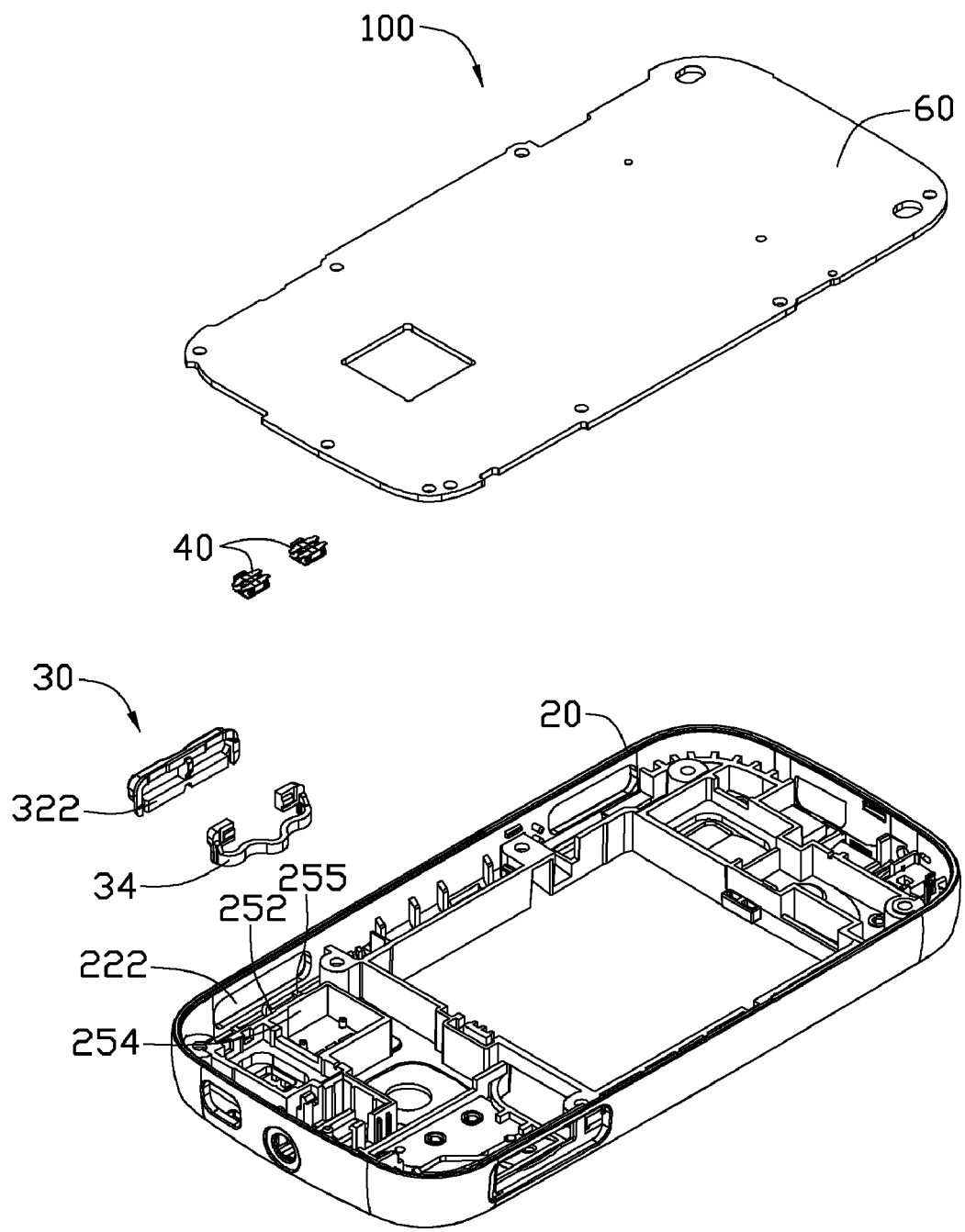
FIG. 3 is similar to FIG. 2, but shown from another aspect.

FIGS. 1 to 3 show a portion of a portable electronic device 100 including a housing 20, at least one control key 30, at least two switches 40, and a printed circuit board (PCB) 60. In the illustrated embodiment, there is just one control key 30.

Figure 4:
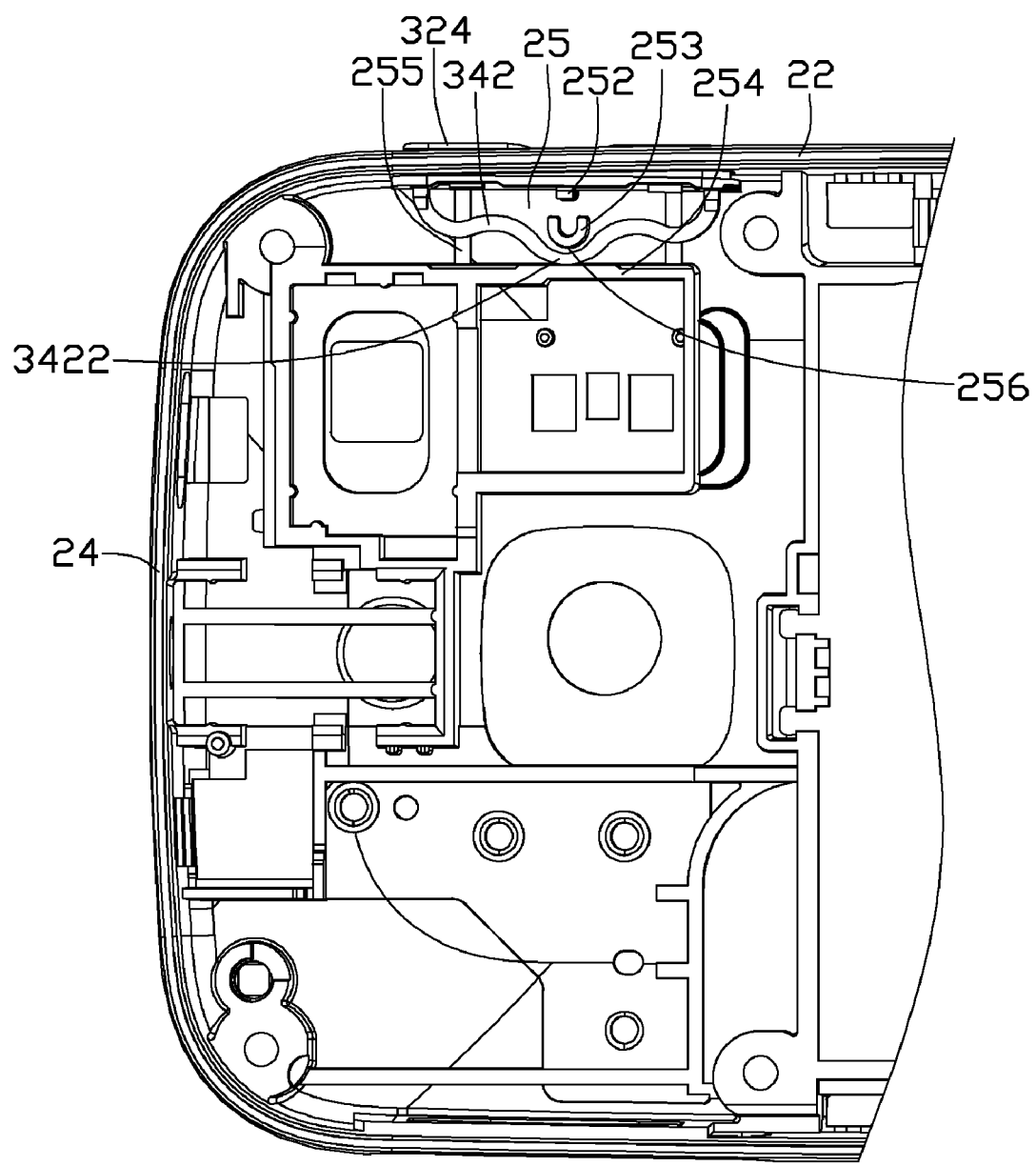
FIG. 4 is an enlarged, plan view of the control key assembly in the housing of the portable electronic device of FIG. 1.

The housing 20 includes two opposite first sidewalls 22, two opposite second sidewalls 24, and a bottom wall 23. The first and second sidewalls 22, 24 and the bottom wall 23 are connected to each other, and cooperatively define a cavity 26. At least one receiving portion 25 is formed on one first sidewall 22. The receiving portion 25 defines a hole 222 for slidably receiving the control key 30. Referring to FIG. 4, a stopper plate 254 is formed on the bottom wall 23, and is opposite to the hole 222. Two ribs 255 perpendicularly intersect the stopper plate 254 and the first sidewall 22. A protrusion 252 protrudes from the bottom wall 23 and intersects an inside of the first sidewall 22. A resisting portion 253 is formed between the first sidewall 22 and the stopper plate 254. The resisting portion 253 is opposite to the protrusion 252. A cross section of the resisting portion 253 is substantially U-shaped, and includes an arcuate surface 256.

Figure 5:
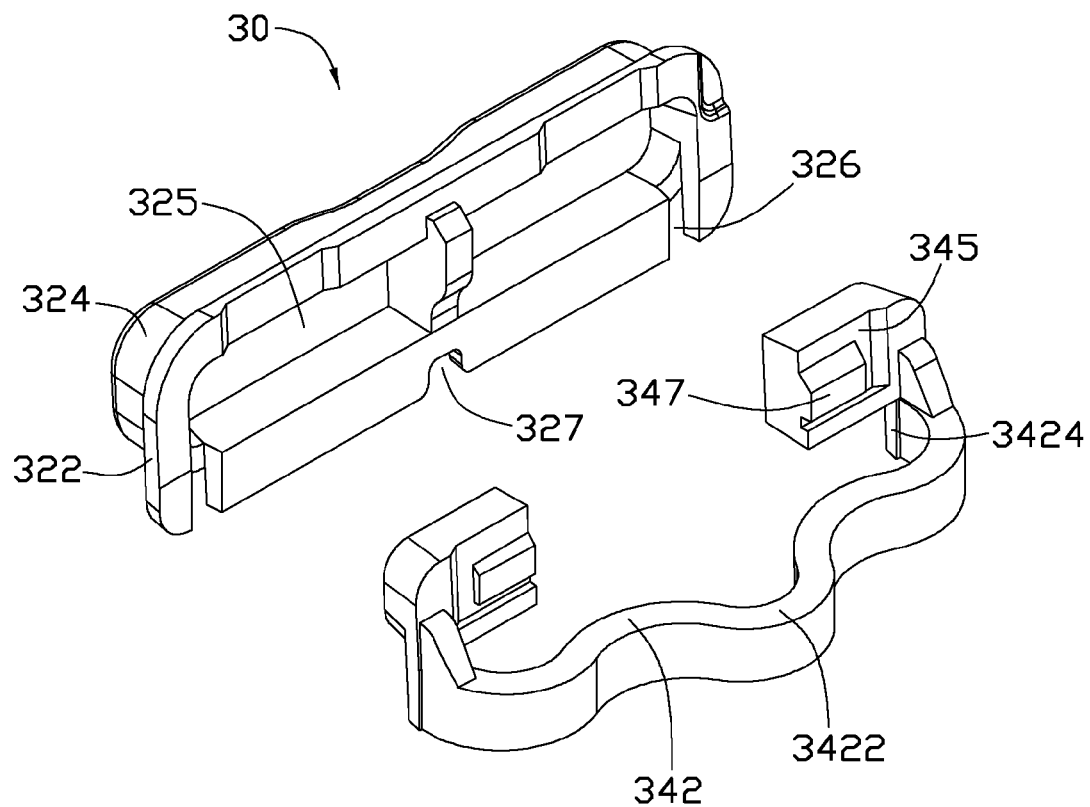
FIG. 5 is an enlarged, exploded isometric view of a control key of the control key assembly.
Figure 6:
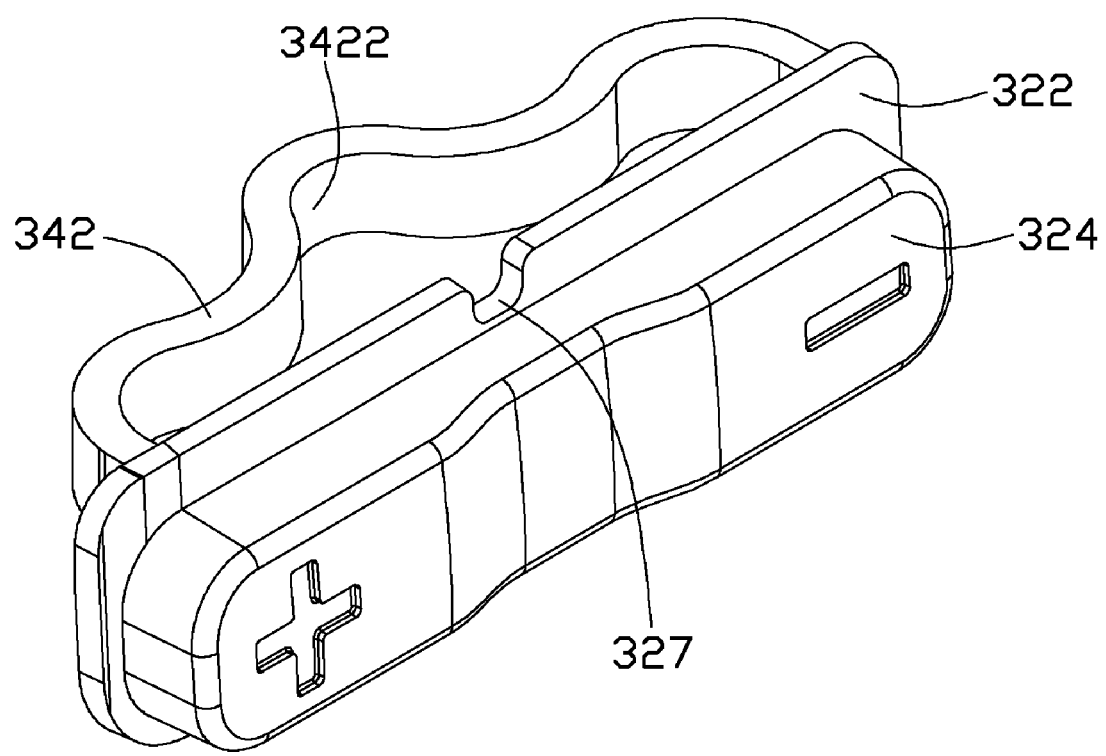
FIG. 6 is an assembled, isometric view of the control key of FIG. 5.

Referring to FIGS. 5 and 6, the control key 30 includes an operating element 32 and an elastic element 34. The operating element 32 includes a main portion 322 and a button portion 324. The main portion 322 is larger than the hole 222 so that it cannot pass through the hole 222. The button portion 324 is configured for being received in the hole 222, and is integrally formed with the main portion 322. The button portion 324 is engraved, embossed, or otherwise labeled with a "+" character and a "−" character at opposite ends. One side of the main portion 322 opposite to the button portion 324 defines two receiving grooves 325, two slots 326, and a cutout 327. The receiving grooves 325 communicate with the slots 326. The cutout 327 is configured for receiving the protrusion 252. The elastic element 34 is made of thermoplastic polyurethane (TPU), and includes a bent arm 342 and two latching portions 345 extending from opposite ends of the bent arm 342. The bent arm 342 is substantially wave-like, and includes an arcuate portion 3422 and two distal end portions 3424. The arcuate portion 3422 is configured for engaging with the arcuate surface 256. Each distal end portion 3424 can be received in a corresponding slot 326. Each latching portion 345 extends from a corresponding distal end portion 3424, and is disposed on the distal end portion 3424. The latching portions 345 can be latched in the receiving grooves 325. A block 347 extends from one side of each latching portion 345 facing the arcuate portion 3422.

Each switch 40 is electronically connected to the PCB 60, and one end of each switch 40 abuts against one block 347. The PCB 60 can be received in the cavity 26 of the housing 20.

Figure 7:
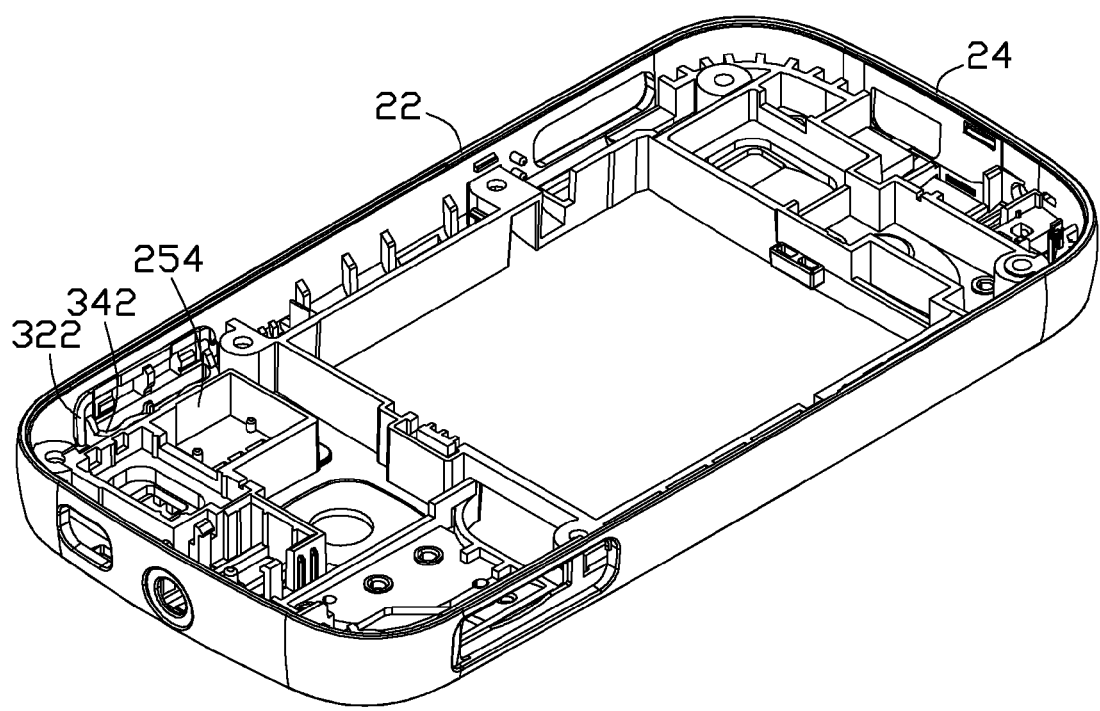
FIG. 7 is an assembled, isometric view of the portable electronic device of FIG. 1, but shown from another aspect and omitting the PCB.

Referring to FIGS. 1 and 7, during assembly, the latching portions 345 are latched in the receiving grooves 325 and the distal end portions 3424 are latched in the slots 326 for connecting the elastic element 34 to the operating element 32. Then, the elastic element 34 with the operating element 32 is attached to the receiving portion 25. The bent arm 342 rides over the ribs 255. The arcuate portion 3422 of the elastic element 34 is positioned between the stopper plate 254 and the resisting portion 253. The main portion 322 of the operating element 32 contacts the first sidewall 22, and the button portion 324 is exposed from the hole 222. The protrusion 252 is slidably engaged in the cutout 327. The blocks 347 are opposite to the switches 40.

In use, the "+" character or "−" character of the button portion 324, when pressed, contacts one of the switches 40, to, for example, generate an electrical signal. The bent arm 342 provides a return force to the control key 30. Since the arcuate portion 3422 is latched between the stopper plate 254 and the resisting portion 253, and the control key 30 is movable in a predetermined range, the operation of the control key 30 is relatively stable.

An alternative embodiment of the control key 30 includes an operating element 32 and an elastic element 34 integrally formed together by a double injection molding process. Thus, the latching structure between the operating element 32 and the elastic element 34 may be omitted.

It is to be understood, however, that even through numerous characteristics and advantages of the present embodiments have been set forth in the foregoing description, together with details of assembly and function, the disclosure is illustrative only, and changes may be made in detail, especially in matters of shape, size, and arrangement of parts within the principles of the disclosure to the full extent indicated by the broad general meaning of the terms in which the appended claims are expressed and equivalents thereof.

What is claimed is:

1. A control key assembly for a portable electronic device, comprising:
   a receiving portion formed on a housing, the receiving portion including a resisting portion and a hole; and
   a control key positioned in the receiving portion, the control key including an operating element and an elastic element, the operating element defining two receiving grooves and being received in the hole, and the elastic element including a bent arm engaging the resisting portion to limit the movement of the control key, and two latching portions extending from opposite ends of the bent arm, and each latching portion being latched in a corresponding receiving groove.

2. The control key assembly of claim 1, wherein the operating element includes a main portion and a button portion mounted to the main portion, and the main portion is larger than the hole to prevent the main portion from passing through the hole.

3. The control key assembly of claim 2, wherein one side of the main portion opposite to the button portion defines two slots, and the receiving grooves communicate with the slots.

4. The control key assembly of claim 3, wherein the bent arm includes an arcuate portion and two distal end portions, each distal end portion is received in a corresponding slot.

5. The control key assembly of claim 4, wherein a block extends from one side of each latching portion facing the arcuate portion.

6. The control key assembly of claim 1, wherein the receiving portion includes a protrusion opposite to the resisting portion, and the operating portion defines a cutout engagingly receiving the protrusion.

7. An electronic device comprising:
   a housing forming a receiving portion defining a hole, the receiving portion including a resisting portion and a stopper plate, a cross section of the resisting portion being substantially U-shaped, the resisting portion including an arcuate surface; and
   a control key positioned in the receiving portion, the control key including an operating element and an elastic element, the operating element being received in the hole, and the elastic element including a bent arm disposed between the resisting portion and the stopper plate, and the arcuate surface engaging with the bent arm.

8. The electronic device of claim 7, wherein the operating element includes a main portion and a button portion integrally formed together, the main portion is larger than the hole to prevent the main portion from passing through the hole.

9. The electronic device of claim 7, wherein the operating element includes a main portion and a button portion, one side of the main portion opposite to the button portion defines two receiving grooves and two slots, and the receiving grooves communicate with the slots.

10. The electronic device of claim 9, wherein the elastic element includes two latching portions extending from opposite ends of the bent arm, the bent arm includes an arcuate portion and two distal end portions, each distal end portion is received in a corresponding slot, each latching portion is latched in a corresponding receiving groove.

11. The electronic device of claim 10, wherein a block extends from one side of each latching portion facing the arcuate portion.

12. The electronic device of claim 7, wherein the receiving portion includes a protrusion opposite to the resisting portion, the main portion defines a cutout engaging with the protrusion.

13. The electronic device of claim 7, wherein the receiving portion includes two ribs, the ribs are perpendicularly intersected with the stopper plate.

14. A control key assembly for an electronic device, comprising:
   a housing comprising a sidewall and a receiving portion, the receiving portion comprising a hole defined in the sidewall, a convex resisting portion, and a stopper plate; and
   a control key positioned in the receiving portion, the control key comprising an elongate operating portion and an elastic portion, the elastic portion including a bent arm and two latching portions extending from opposite ends of the bent arm, the operating portion defining two receiving grooves and being received in the hole, each latching portion being latched in a corresponding receiving groove, the bent arm of the elastic portion pivotably held between the resisting portion and the stopper plate with the convexity of the resisting portion abutting the concavity of the bent arm of the elastic portion such that when one end of the operating portion is pressed the control key pivots in a first direction and when an opposite end of the operating portion is pressed the control key pivots in a second direction opposite to the first direction.

15. The control key assembly of claim 14, wherein the resisting portion limits sliding of the elastic portion relative to the stopper plate when either end of the control key is pressed.

16. The control key assembly of claim 14, wherein the receiving portion includes two ribs, the ribs are perpendicularly intersected with the stopper plate.

* * * * *